United States Patent [11] 3,607,191

[72] Inventors Richard A. Birner;
 Arthur C. Einfalt, both of Toledo, Ohio
[21] Appl. No. 46,432
[22] Filed June 15, 1970
[45] Patented Sept. 21, 1971
[73] Assignee Owens-Illinois, Inc.

[54] GLASS-FORMING MACHINE WITH POSITION SENSING MEANS
7 Claims, 8 Drawing Figs.
[52] U.S. Cl. .................................................. 65/158,
 65/163, 65/184, 65/251
[51] Int. Cl. .......................................... C03b 21/04
[50] Field of Search ........................................ 65/158,
 163, 184, 185, 186, 251

[56] References Cited
UNITED STATES PATENTS
3,180,718 4/1965 Wilhelm ........................ 65/158
2,748,937 6/1956 Casler et al. .................. 65/158 X Primary Examiner—Arthur D. Kellogg
Attorneys—J. R. Nelson and E. J. Holler ABSTRACT: A glass-forming machine comprising a first articulated conveyor that has a plurality of orifice plates onto which a ribbon of glass is delivered and a second articulated conveyor having a plurality of plungers moving along in synchronism with the orifice plates and movable radially toward and away from the glass ribbon on the orifice plate. Means are provided along a portion of the path of each of the conveyors for sensing the positions of the orifice plates and the plungers as they pass a sensing station. The resultant sensing pulses are analyzed to determine the relative synchronization of the orifice plates and plungers.

PATENTED SEP21 1971 3,607,191

INVENTORS
RICHARD A. BIRNER & ARTHUR C. EINFALT

BY J. R. Nelson and
E. J. Keeler

ATTORNEYS

INVENTORS
RICHARD A. BIRNER & ARTHUR C. EINFALT

BY J. R. Nelson and
E. J. Holler

ATTORNEYS

INVENTORS
RICHARD A. BIRNER & ARTHUR C. EINFALT

BY J. R. Nelson and
E. J. Holler

ATTORNEYS

GLASS-FORMING MACHINE WITH POSITION SENSING MEANS

This invention relates to a machine having a synchronized detection system.

BACKGROUND OF THE INVENTION

In various machines such as a ribbon glass machine, it is common to have articulated conveyors with work-performing devices thereon which have portions thereof movable in a parallel path to one another. It is desirable in order to produce proper parts on the machines to be able to know when perfect synchronization of the movement of the work devices is achieved. Moreover, because articulated conveyors inherently are subject to wear, it is desirable to continuously detect the relative synchronization in order to provide for correction or repair.

Accordingly, among the objects of the present invention are to provide a machine which incorporates a novel synchronization detection system; which system does not operate by direct contact with any parts; which system may be utilized to provide a record of the positional state of the parts and control the relative position of the various parts.

SUMMARY OF THE INVENTION

Basically the invention relates to a glass-forming machine comprising a first articulated conveyor that has a plurality of orifice plates onto which a ribbon of hot glass is delivered and a second articulated conveyor having a plurality of plungers moving along in synchronism with the orifice plates and movable laterally toward and away from the glass ribbon on the orifice plate. Means are provided along a portion of the path of each of the conveyors for sensing the positions of the orifice plates and the plungers as they pass a sensing station. The resultant sensing pulses are analyzed to determine the relative synchronization of the orifice plates and plungers.

DESCRIPTION

Figure 1:
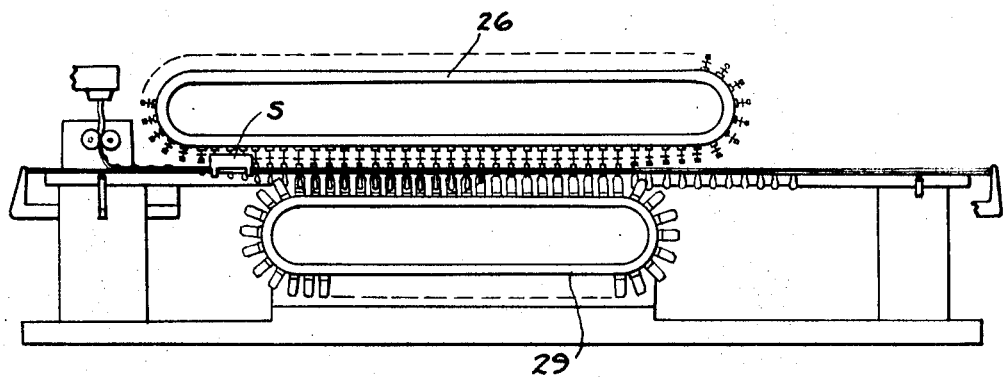
FIG. 1 is a partly diagrammatic side elevational view of a machine embodying the invention.
Figure 2:
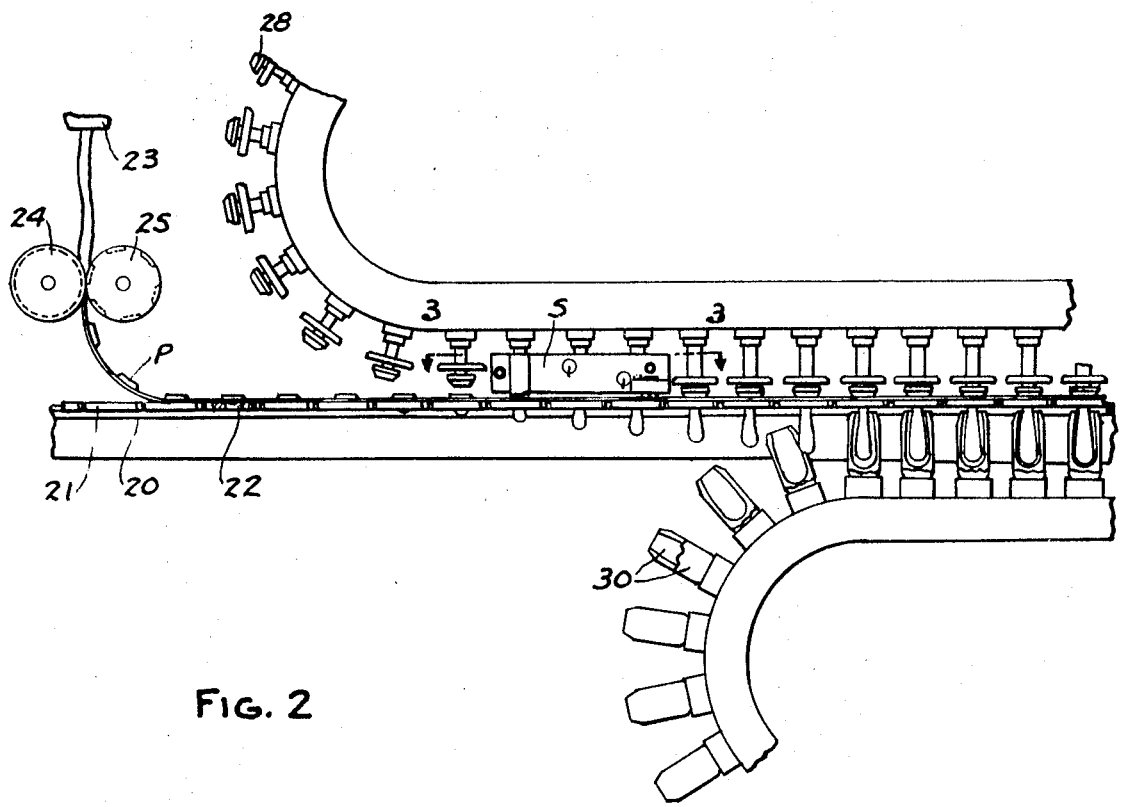
FIG. 2 is a fragmentary-part sectional side elevational view on an enlarged scale of a portion of the machine shown in FIG. 1.
Figure 3:
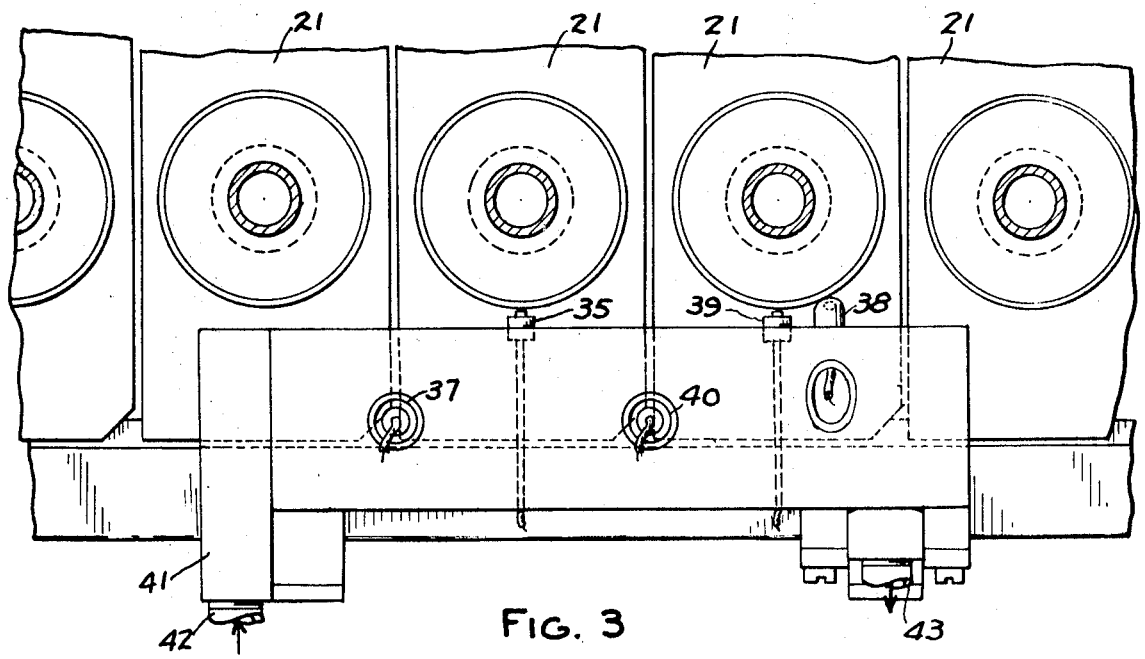
FIG. 3 is fragmentary sectional view on an enlarged scale taken along the line 3—3 in FIG. 2.
Figure 4:
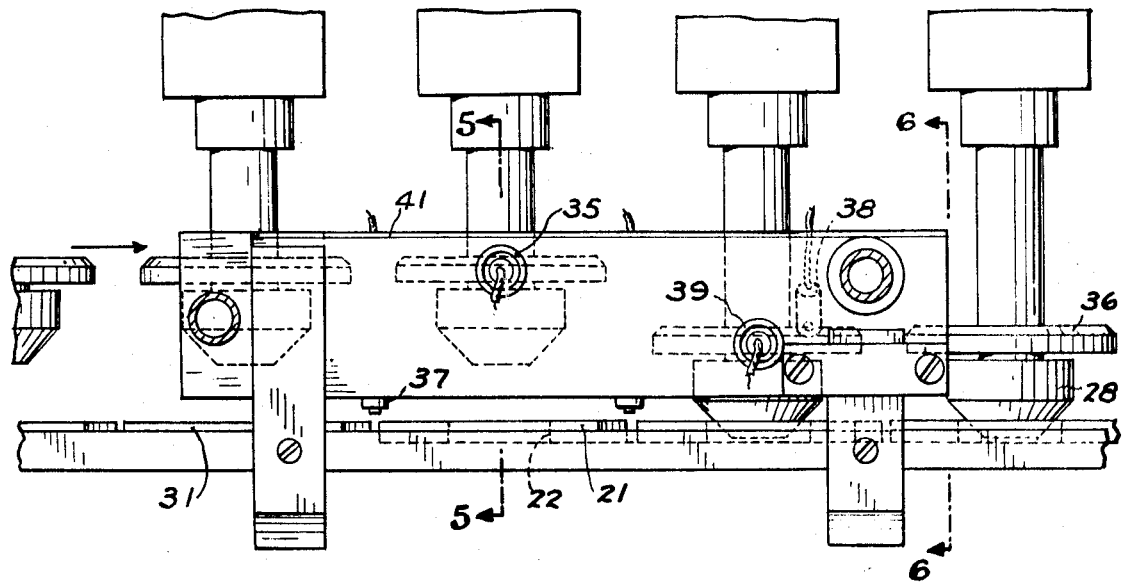
FIG. 4 is a fragmentary side elevational view of the portion of the apparatus shown in FIG. 3
Figure 5:
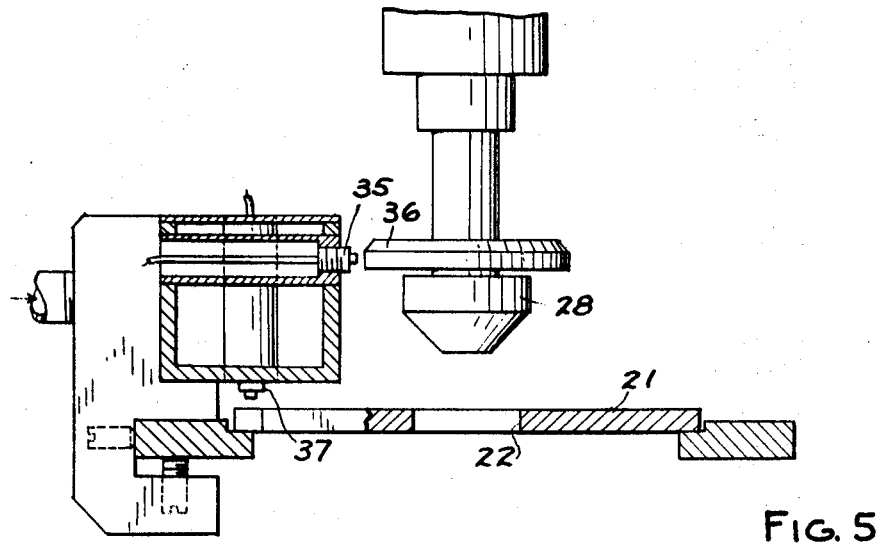
FIG. 5 is a fragmentary sectional view taken along the line 5—5 in FIG. 4.
Figure 6:
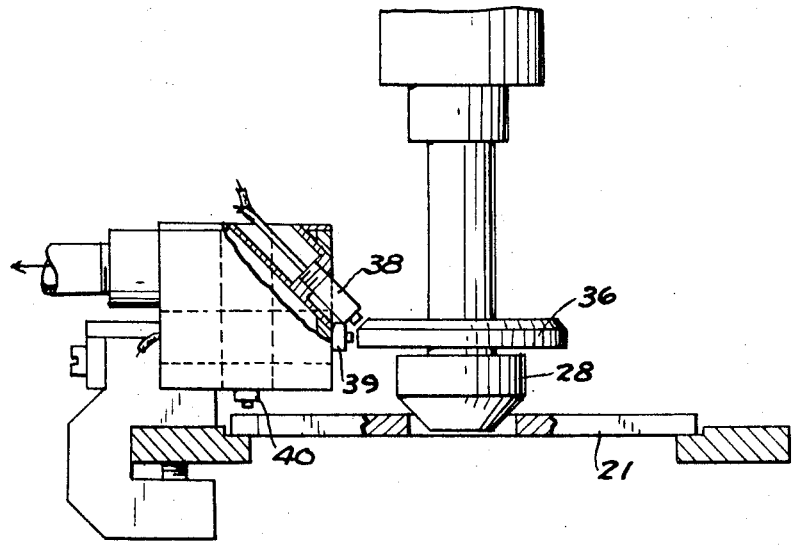
FIG. 6 is a fragmentary sectional view taken along the line 6—6 in Fig. 4.

Referring to Figs. 1 and 2, the apparatus embodying the invention is shown as comprising a ribbon glass forming machine of the type disclosed in U.S. Pat. No. 1,790,397 which comprises an articulated conveyor 20 comprising a plurality of pivotally interconnected orifice plates 21 having orifices or openings 22. The conveyor 20 is driven in accordance with the conventional manner beneath a glass ribbon outlet 23 that feeds a ribbon of hot glass to shaping rolls 24, 25 to produce interconnected gobs or patties P that are delivered onto the plates 21 of the conveyor 20.

A second articulated conveyor 26 comprising interpivoted elements is provided in generally overlying relation to a portion of the conveyor 20 and supports blow tips and plungers 28 that are moved in a path in overlying synchronized relation with a portion of the path of the orifice plate 21. The plungers 28 are movable toward and away from the orifices 22 of the orifice plates 21 engage the patties P, partially shape the patties, and permit air to be blown in through the plungers to shape the patties into hollow elongated parisons, all in accordance with conventional practice.

A third articulated conveyor 29 is provided beneath a portion of the path of the conveyor 20 and comprises mold halves 30 that enclose a portion of each elongated parison of glass. The molds 30 rotate while air is blown into the interior of the parisons of glass to shape the parisons, again in accordance with conventional practice.

In accordance with the invention, a system is provided for detecting the relative synchronism between the plungers 28 and the orifice plates 21.

As shown in Figs. 1 and 2, a detection station S is provided along a portion of the path of the plungers 28 moved in synchronism with and axially toward the orifice plates 21.

Specifically, as shown in Figs. 3–6, a first magnetic sensor 35 is mounted in fixed position adjacent the path of a ring 36 fixed on plunger 28 in position to be energized by the ring 36 prior to movement of the plunger 28 toward the orifice plates 21. As the plunger 28 passes the stationary sensing device 35, a pulse is produced. Similarly, a magnetic sensing device 37 is supported in fixed relation to be energized by the edge of an orifice plate 21. This again will produce a pulse. If the pulses from the sensing devices 35, 37 occur simultaneously, a synchronism is indicated between the position of the plunger 28 and the orifice plate 21.

Third and fourth sensing devices 38, 39 are provided adjacent another portion of the path of the plungers 28 in the area where the plungers are in position for pressing against the glass on the orifice plate 21. These sensing devices similarly produce pulses as the ring 36 passes the devices. Associated therewith is an additional sensing device 40 which is adapted to sense the position of the edge of the orifice plate 21. Again, if the signal from the sensing device 40 is simultaneous with those from the devices 38, 39, synchronization between the downmost position of the plunger 28 and the orifice plate 21 is indicated.

As shown in Figs. 3–6, the sensing devices 35, 37, 38, 39 and 40 are mounted in a box 41 and electrically insulated therefrom. The box 41 is hollow and has an inlet 42 and outlet 43 through which cooling liquid can be directed to cool the sensing devices.

Figure 7:
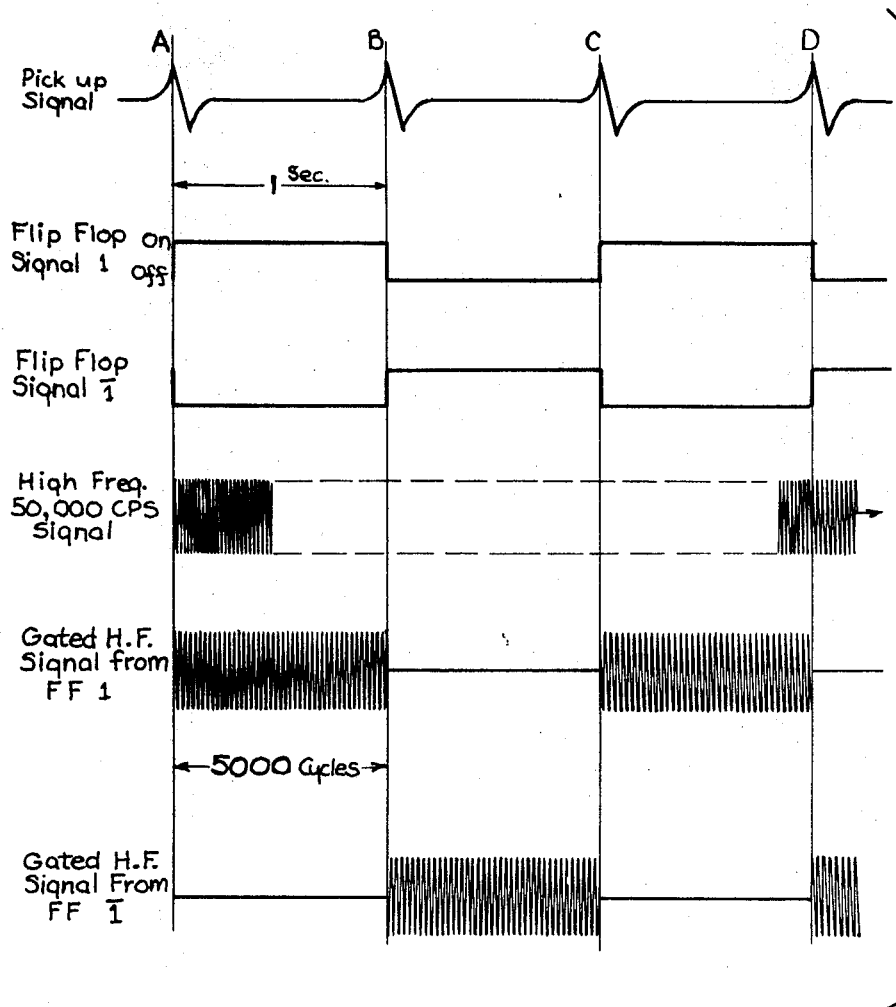
FIG. 7 is a pulse diagram showing the various pulse curves in various parts of the system.
Figure 8:
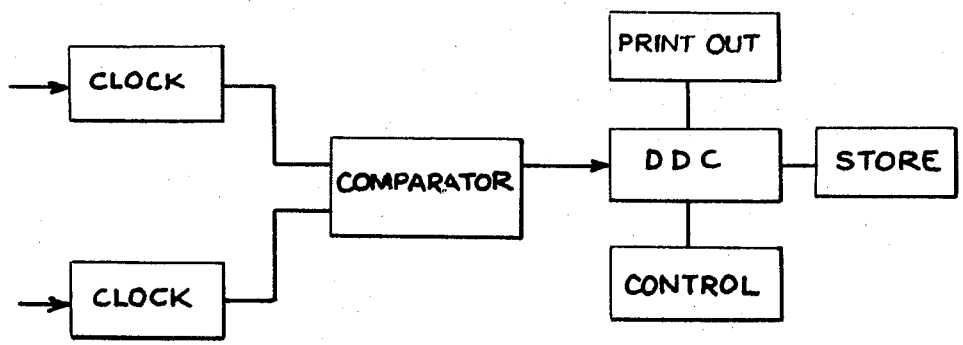
FIG. 8 is a schematic diagram of the electrical circuit utilized in the system.

A typical pulse signal produced by each of the sensing devices 35, 37, 38, 39 and 40 is shown and designated as a pickup signal in Fig. 7. The time interval between the pulses represents the velocity of the part of the conveyor that is being sense, namely, the orifice plate or blow tip.

In the circuits associated with the present system, the pickup signals or pulses are utilized to generate high frequency signals whose frequency is related to the linear velocity.

By utilizing the pulse or pickup signals to actuate flip-flops which in turn would gate high frequency signals and then in turn counting the cycles, it is possible to determine the distance between the portions of the conveyor producing the pulse or pickup signals. Thus, referring to Fig. 7, if the first pickup signal A is utilized to actuate a flip-flop signal 1, the flip-flop will gate on and permit high frequency current to pass until the second signal B shuts off flip-flop signal 1 and permits the gated high frequency to pass through flip-flop signal $\bar{1}$. Successive signals C and D will gate flip-flop signal 1 and flip flop signal $\bar{1}$ on and off so that alternate outputs of the flip-flops represent alternate distances between portions of the conveyor. By passing the gated high frequency signals through a comparator or counter which counts the cycles and is calibrated for distance, the exact dimension between the pulses may be determined. In other words, the pitch length between the portions of the conveyor may be determined. In this instance, the distance between the plunger 28 on the one hand and the edges of the orifice plates 21 on the other. This information can be utilized to indicate variations in pitch length of ether of the conveyors due to wear.

The signals from the working device, in this case the orifice and plunger or blow tip, can also be utilized to ascertain alignment or misalignment of the orifice plate and plunger tips. If the orifice signal and blow tip signal are in perfect synchronism, that is, they occur simultaneously, a gate provided by a J–K flip-flop controlled by the two signals will be simultaneously turned on and off and as a result, there will be no high frequency signal passed through the gate. On the other hand, if the signals are not simultaneous, the orifice signal will start the passage of high frequency current through J–K flip-flop and the blow tip signal will stop the flow of high frequency signals through the K–K flip-flop producing a gated high frequency signal of a duration corresponding to the degree or extent of misalignment. This can be directed to a counter which counts the cycles and is calibrated for distance to indicate the linear displacement or misalignment between the orifice plate and the blow tip plunger.

Similarly, if the orifice and blow tips are misaligned with the orifice plate leading rather than lagging the blow tip, the blow tip signal will keep the J–K flip-flop inactivated until the orifice signal activates the flip-flop to permit passage of the high frequency signal. Once again, the counter will be able to read the duration of the high frequency signal directly as a distance.

The high frequency signal must have a frequency which is related to the number of orifices or blow tips per minute at the desired preferred speed in such a manner that each single cycle represents a predetermined distance of lineal length, for example, 0.001 inch.

We claim:
1. In a hot glass forming machine, the combination comprising
   a first articulated conveyor comprising a plurality of conveyor elements pivotally interconnected to one another,
   a second articulated conveyor comprising a plurality of conveyor elements pivoted to one another,
   said first conveyor having work devices thereon,
   said second conveyor having support devices thereon being adapted to carry successive charges of glass on which said work devices of said one conveyor function,
   said conveyors being moved in synchronism along a portion of their path of travel with the work devices adjacent one another,
   first means adjacent a portion of the path of said first conveyor for sensing the position of the portion of the work devices thereon as the work devices move past a sensing station,
   second means adjacent a portion of the path of said second conveyor for sensing the position of a portion of the support devices thereon as the devices move past a sensing station,
   each said sensing means producing a pulse as its respective work device passes the sensing station,
   and means for comparing the time intervals between said pulses.
2. The combination set forth in claim 1 wherein said comparing means comprises means for averaging the time interval between the pulses of each said conveyor,
   and means for comparing the averages with one another.
3. The combination set forth in claim 1 wherein the work devices on said first conveyor includes a portion thereof that is movable transversely relative to the work devices of the other conveyor,
   a third sensor for sensing the passage of a portion of said movable part past a sensing station,
   and means for comparing the time interval between the pulses produced by said third sensor with the time interval produced by said sensor means.
4. The combination set forth in claim 3 including means for comparing the time interval between the pulse rate of said third sensor means with said other sensor means.
5. The combination set forth in claim 1 wherein said last-mentioned means includes means for creating a high frequency standard signal,
   a flip-flop to which said signal is supplied,
   said pulses of each said first and second sensor means being utilized to successively actuate said flip-flop wherein portions of said high frequency signal are gated to pass by alternate pulses from said sensor means,
   and a comparator for counting the high frequency pulses passing through said flip-flops and thereby determining the pitch length between the conveyor elements of the respective conveyors.
6. The combination set forth in claim 1 wherein said last-mentioned means includes means for creating a high frequency pulse signal,
   a flip-flop,
   means connecting the signal from said first sensor means to said flip-flop,
   means connecting the signal form said second sensor means to said flip-flop,
   means for supplying said high frequency pulse signal to said flip-flop being operable to permit passage of said high frequency pulse signal when said first and second sensor signals are not in synchronism,
   and means for counting the pulses passing through said flip-flop and thereby determining the relative misalignment of the work devices on said conveyor elements.
7. The combination set forth in claim 1 wherein said second conveyor comprises a plurality of interconnected orifice plates having orifices therein for supporting a ribbon of hot glass, said first conveyor comprising plungers for engaging said hot glass over said orifices.